US008787751B2

(12) United States Patent
Shaffer et al.

(10) Patent No.: US 8,787,751 B2
(45) Date of Patent: Jul. 22, 2014

(54) METHOD FOR IDENTIFYING THE OPTICAL NETWORK UNIT POWER OFF REASON

(75) Inventors: Michael Shaffer, Longwood, FL (US); Yin Jinrong, Shenzhen (CN); Lin Wei, Shenzhen (CN); Yang Sulin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 517 days.

(21) Appl. No.: 12/756,764

(22) Filed: Apr. 8, 2010

(65) Prior Publication Data
US 2010/0272433 A1    Oct. 28, 2010

Related U.S. Application Data

(60) Provisional application No. 61/171,500, filed on Apr. 22, 2009.

(51) Int. Cl.
*H04B 10/08* (2006.01)
(52) U.S. Cl.
USPC ............ 398/17; 398/19; 398/38; 398/70; 398/71
(58) Field of Classification Search
CPC ............... H04B 10/07955; H04B 10/0795; H04B 10/272; H04J 2203/0062; H04J 2203/0071; H04Q 2011/0083
USPC .......... 398/17, 15, 38, 66, 94, 120, 171, 19, 398/70, 71, 72, 67, 18
See application file for complete search history.

(56) References Cited

U.S. PATENT DOCUMENTS 5,523,868 A * 6/1996 Hawley ..................... 398/38
5,943,228 A * 8/1999 Kim ........................ 363/100
(Continued)

FOREIGN PATENT DOCUMENTS

CN    2733374 Y    10/2005
CN    1852171 A    10/2006

OTHER PUBLICATIONS

Series G: Transmission Systems and Media, Digital Systems and Networks, Digital Sections and Digital Line System—Optical Line Systems for Local and Access Networks, Gigabit-capable Passive Optical Networks (GPON): ONT Management and Control Interface Specification, Amendment 2: Changes and Extensions to the OMCI, Editorial Clarifications and Corrections, ITU-T G.984.4, Nov. 2009, 164 pages.

(Continued)

*Primary Examiner* — Daniel Washburn
*Assistant Examiner* — Hibret Woldekidan
(74) *Attorney, Agent, or Firm* — Conley Rose, P.C.; Grant Rodolph; Jonathan K. Polk

(57) ABSTRACT

A passive optical network (PON) component comprising a power switch, a detector configured to monitor the power switch, and a processor configured to receive an interrupt from the detector and transmit a message comprising a first indicator that the PON component has powered down, and a second indicator giving a reason for the power down. A passive optical network (PON) component comprising a processor configured to implement a method comprising receiving an interrupt message from a detector, determining a reason for the interrupt, and transmitting a dying gasp message comprising an indicator of the reason for the interrupt. A method comprising transmitting an alarm message comprising an optical network terminal (ONT) manual power off indicator that indicates the ONT is shutting down because a subscriber has turned off its power switch.

17 Claims, 9 Drawing Sheets

(56) References Cited

U.S. PATENT DOCUMENTS

| | | | |
|---|---|---|---|
| 6,933,852 B2* | 8/2005 | Kitajima et al. | 340/635 |
| 7,441,061 B2* | 10/2008 | Gilligan | 710/300 |
| 7,646,990 B2* | 1/2010 | Weber et al. | 398/197 |
| 8,000,602 B2* | 8/2011 | Haran et al. | 398/72 |
| 8,055,127 B2* | 11/2011 | Magri et al. | 398/18 |
| 8,330,425 B2* | 12/2012 | Hughes et al. | 320/137 |
| 8,355,629 B2* | 1/2013 | Mahony et al. | 398/17 |
| 8,559,814 B2* | 10/2013 | Horishita et al. | 398/25 |
| 8,625,987 B2* | 1/2014 | Pfeiffer et al. | 398/33 |
| 8,670,663 B2* | 3/2014 | Mahony et al. | 398/22 |
| 2004/0208631 A1* | 10/2004 | Song et al. | 398/168 |
| 2004/0259540 A1* | 12/2004 | Banerjee et al. | 455/425 |
| 2006/0120723 A1* | 6/2006 | Diouf et al. | 398/71 |
| 2006/0198635 A1* | 9/2006 | Emery et al. | 398/38 |
| 2007/0286609 A1* | 12/2007 | Ikram et al. | 398/197 |
| 2008/0025721 A1* | 1/2008 | Wynman | 398/38 |
| 2008/0195881 A1* | 8/2008 | Bernard et al. | 713/340 |
| 2008/0304825 A1* | 12/2008 | Mahony et al. | 398/38 |
| 2009/0016721 A1* | 1/2009 | Wurst et al. | 398/67 |
| 2009/0022058 A1 | 1/2009 | Li et al. | |
| 2009/0245727 A1* | 10/2009 | Shimizu et al. | 385/18 |
| 2010/0215359 A1* | 8/2010 | Li et al. | 398/22 |
| 2013/0275795 A1* | 10/2013 | Ellis et al. | 713/324 |

OTHER PUBLICATIONS

Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, ITU-T G.984.3, Mar. 2008, 146 pages.

Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, ITU-T G.984.4, Feb. 2008, 430 pages.

ITU-T G.984.4, Erratum 1, Aug. 2009, 2 pages.

Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, ITU-T G.984.4, Amendment 1, Jun. 2009, 92 pages.

Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, ITU-T G.984.4, Corrigendum 1, Mar. 2010, 8 pages.

ITU-T G.984.3, Erratum 1, Apr. 2010, 1 page.

Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 1—Specification of the ONU Registration Method and Various Clarifications, ITU-T G.984.3, Feb. 2009, 16 pages.

Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 2: Time-of-day Distribution and Maintenance Updates and Clarifications, ITU-T G.984.3, Nov. 2009, 18 pages.

Foreign Communication From a Counterpart Application, Chinese Application 201010166506.1, Chinese Office Action dated Mar. 20, 2013, 7 pages.

Foreign Communication From a Counterpart Application, Chinese Application 201010166506.1, Partial Translation of Chinese Office Action dated Mar. 20, 2013, 6 pages.

"Series G: Transmission Systems and Media Digital Systems and Networks, Digital Sections and Digital Line System—Optical Line Systems for Local and Access Networks, Gigabit-Capable Passive Optical Networks (G-PON): Transmission Convergence Layer Specification," ITU-T, G.984.3, Feb. 2004, 35 pages.

Foreign Communication From A Counterpart Application, Chinese Application No. 201010166506.1, Chinese Office Action dated May 7, 2014, 7 pages.

\* cited by examiner

Dying Gasp Message

| Octet | Content | Description |
|---|---|---|
| 1 | ONU-ID | Indicates ONU sourcing this message |
| 2 | 00000011 | Message identification "Dying Gasp" |
| 3 | 00000abc | Reason Indication<br>"abc" indicates the reason that causes this dying gasp message<br>001 – The power switch is formally shut off<br>010 – The external power is abnormally off<br>100 – internal circuit fault |
| 4-12 | Unspecified | N/A |

| Number | Alarm | Description |
|---|---|---|
| ... | ... | ... |
| 7 | Dying Gasp | ONT is powering off immediately due to loss of power to the ONT itself. This alarm may be sent in conjunction with the powering alarm if a backup unit cannot supply the power and the ONT is shutting down. |
| ... | ... | ... |
| 12 | ONT Manual power off | The ONT is shutting down because the subscriber has turned off its power switch |
| 13 | Dying Gasp caused by external power loss | ONT is powering off because of the external power loss |
| 14 | Dying Gasp caused by circuit fault | ONT is powering off because of the internal circuit fault |
| 15...207 | Reserved | |

| Bit Position | Function |
|---|---|
| 7 (MSB) | Urgent PLOAMu waiting (1 = PLOAM waiting, 0 = no PLOAMs waiting) |
| 6 | FEC status (1 = FEC ON, 0 = FEC OFF) |
| 5 | RDI status (1 = defect, 0 = OK) |
| 4 | Reserved |
| 3…1 | Reason Indication<br>001 – The power switch is formally shut off<br>010 – The external power is abnormally off<br>100 – internal circuit fault |
| 0 (LSB) | Reserved for future use |

FIG. 6

METHOD FOR IDENTIFYING THE OPTICAL NETWORK UNIT POWER OFF REASON

CROSS-REFERENCE TO RELATED APPLICATIONS

The present application claims priority to U.S. Provisional Patent Application 61/171,500, filed Apr. 22, 2009 by Michael R. Shaffer et al., and entitled "A New Method for Identifying the Optical Network Unit Power Off Reason," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Some ONUs are configured to send a message indicating power loss at the ONU. The message does not include a reason for the power loss, and receiving a power loss message without a reason for the power loss can be problematic for the recipient of the message.

SUMMARY

In an embodiment, the disclosure includes a passive optical network (PON) component comprising a power switch, a detector configured to monitor the power switch, and a processor configured to receive an interrupt from the detector and transmit a message comprising a first indicator that the PON component has powered down, and a second indicator giving a reason for the power down.

In another embodiment, the disclosure includes a passive optical network (PON) component comprising a processor configured to implement a method comprising receiving an interrupt message from a detector, determining a reason for the interrupt, and transmitting a dying gasp message comprising an indicator of the reason for the interrupt.

In yet another embodiment, the disclosure includes a method comprising transmitting an alarm message comprising an optical network terminal (ONT) manual power off indicator that indicates the ONT is shutting down because a subscriber has turned off its power switch.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a block diagram of an embodiment of a physical layer operation, administration, and management (PLOAM) message.

FIG. 5 is a block diagram of an embodiment of ONT management and control interface (OMCI) alarm extensions.

FIG. 6 is a block diagram of an embodiment of an embedded operation, administration, and management (OAM) message.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One type of PON is a gigabit PON (GPON), which has been standardized by International Telecommunication Union (ITU) Telecommunication Standardization Sector (ITU-T) G.984. GPON performs OAM functions using three channels: embedded OAM, PLOAM, and OMCI. Embedded OAM utilizes structured overhead fields of downstream GPON transmission convergence (GTC) frames and upstream GTC bursts. Embedded OAM is defined by the ITU-T G.984.3 standard, which is incorporated herein as if reproduced in its entirety. The PLOAM channel is a message-based OAM channel between the OLT and the ONUs that supports the GTC layer management functions, including ONU activation, ONU management and control channel establishment, encryption configuration, key management, and alarm signaling. The PLOAM channel and message types are defined by the ITU-T G.984.3 standard. OMCI is a management channel between the OLT and the ONUs that supports Ethernet, equipment, subscriber interface, and subscriber feature management. OMCI is standardized in the ITU-T G.984.4 standard, which is incorporated herein as if reproduced in its entirety. OMCI supports alarm reporting, and one type of alarm presently supported by OMCI is a Dying Gasp alarm. The Dying Gasp alarm is reported to the OLT by an ONU when the ONU loses power. Dying Gasp may be reported via the PLOAM channel and/or the OMCI channel.

Disclosed herein is a system and method for identifying an ONU power off reason. Some subscribers may power down an ONU when not in use to conserve electricity. A dying gasp message may be sent responsive to the subscriber power down of the ONU. If the dying gasp message does not contain a reason for the message, an OLT may interpret the power down as an area wide power disruption rather than an intentional subscriber action. Thus, a dying gasp message may be sent to an OLT with a reason for the ONU power loss which may prevent erroneous action by the OLT or central office. The ONU may implement a hardware centric power switch, a software centric power switch, or both. The ONU may monitor the state of the power switch, input power level, or a battery power level, in order to identify the cause for power loss at the ONU. After a power loss, the ONU may send a message identifying the cause for the power loss before powering down.

Figure 1:
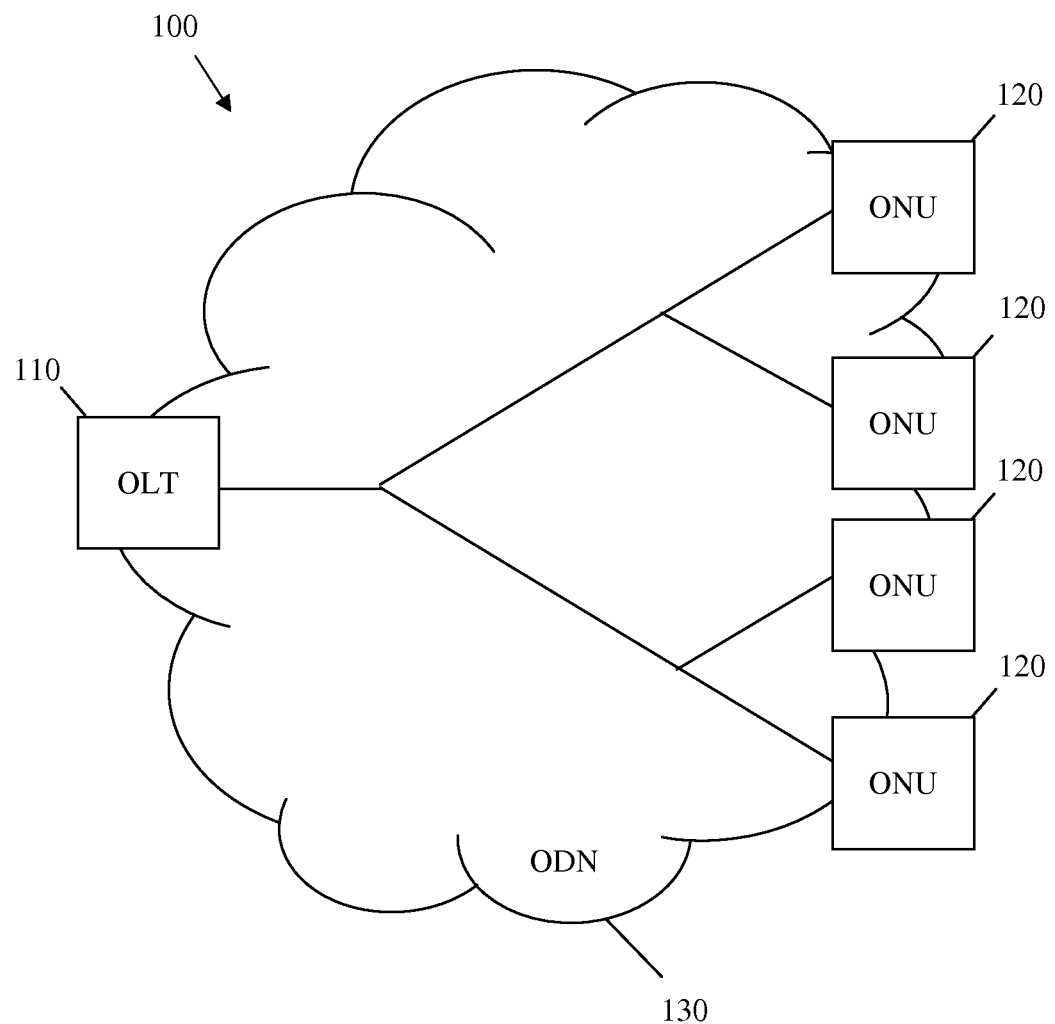
FIG. 1 is a schematic diagram of an embodiment of a PON.

FIG. 1 illustrates one embodiment of a PON 100 configured to implement the concepts described herein. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be Next Generation Access (NGA) system, such as ten gigabits per second (Gbps) GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the ITU-T G.983 standard, the GPON defined by the ITU-T G.984 standard, the Ethernet PON (EPON) defined by the Institute of Electrical and Electronics Engineers (IEEE) 802.3ah standard, 10G EPON as defined by the IEEE 802.3av standard, and the wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer to the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point (P2MP) configuration.

In an embodiment, the OLT 110 and/or the ONUs 120 may comprise a data framer, which may be coupled to the transmitter and/or the receiver. The data framer may be any device configured to process the data between the OLT 110 and the ONUs 120 by framing the data into frames or obtaining the data from the frames according to a PON protocol, such as IEEE 802.3ah and/or 802.3av. The data framer may be hardware, such as a processor, comprising electronic or logic circuitry, which may be designed for such purpose. Alternatively, the data framer may be software or firmware, which may be programmed for such purpose. Specifically, the data framer may be configured to generate media access control (MAC) control messages, which may be used to promote OAM functions in the PON 100. The data framer may be configured to generate different control messages, for instance to implement different OAM functions according to different organizations or architectures. For example, the data framer may frame control data for different providers, customer networks, or standardization and/or regulatory organizations (e.g. IEEE, ITU-T, etc.) into a MAC control message.

Figure 2A:
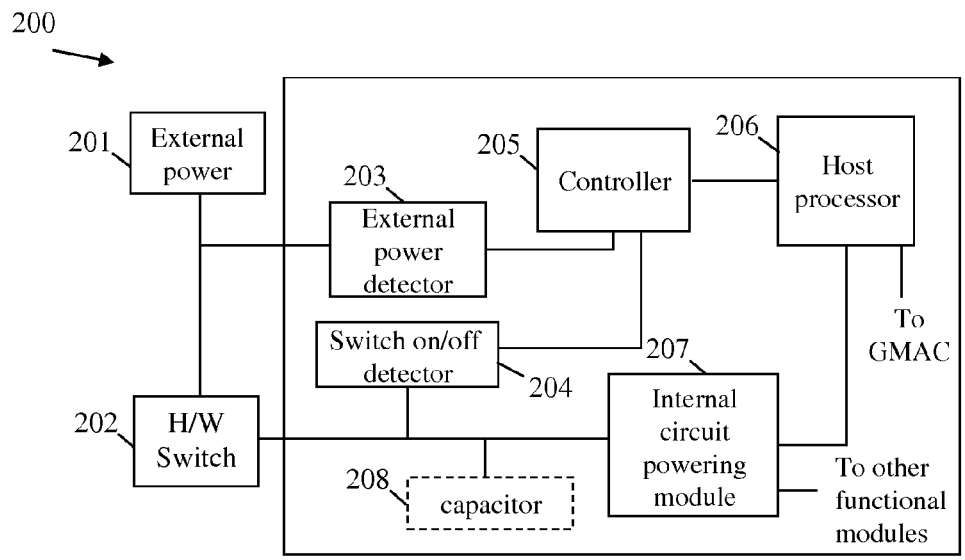
FIG. 2A is a schematic diagram of a first embodiment of an ONU with hardware centric power detection.

FIG. 2A is a schematic diagram of a first embodiment of an ONU with hardware centric power detection 200. The ONU with hardware centric power detection 200 may comprise an external power detector 203 coupled to an external power source 201 and a controller 205. The ONU with hardware centric power detection 200 may further comprise a hardware switch 202 coupled to a switch detector 204, an optional capacitor 208, and an internal circuit power module 207. The controller 205 may be coupled to the switch detector 204 and a host processor 206. The host processor 206 may be coupled to the internal circuit power module 207 and a gigabit media access controller (GMAC) (not shown). The internal circuit power module 207 may be coupled to other functional modules not shown in the schematic diagram. The internal circuit power module 207 may provide power for all of the modules in the ONU with hardware centric power detection 200.

The switch detector 204 may be configured to monitor and detect the position of the hardware switch 202, e.g. on or off. If the hardware switch 202 is moved to the off position, the switch detector 204 may detect the position of the switch and send an indicator to the controller 205. The indicator may notify the controller 205 of the position of the hardware switch 202. The controller 205 may store the occurrence of the hardware switch 202 changing to off. The controller 205 may also store the time of the change and other relevant data related to the hardware switch 202 being changed to the off position. Upon receiving the indicator from the switch detector 204, the controller 205 may notify the host processor 206 of the change. The notification may be in the form of an interrupt sent to the host processor 206. Upon receiving the interrupt, the host processor 206 may use system software to generate and transmit an ONU manual power off message comprising a reason for power loss indicator, e.g. ONU switched off. The generation and transmission of the ONU manual power off message may be performed by hardware and/or software available on the ONU with hardware centric power detection 200. The ONU manual power off message may be transmitted to an OLT at a central office. The central office or the OLT may take actions based upon the reason for power loss contained in the ONU manual power off message.

The external power detector 203 may be configured to monitor and measure the power level received from the external power source 201. If the power level received from the external power source 201 drops below a predefined level, e.g. the level necessary for operation of the ONU with hardware centric power detection 200, the external power detector 203 may alert the controller 205. Upon receiving the alert from the external power detector 203, the controller 205 may notify the host processor 206 of the alert. The notification may be in the form of an interrupt sent to the host processor 206. The host processor 206 may then transmit a message comprising the power loss reason to an OLT connected to the ONU with hardware centric power detection 200, e.g. power loss due to external power source 201 failure.

The amount of time available for the ONU with hardware centric power detection 200 to generate and transmit a message after power loss is dependant upon the capacity of the capacitor 208. A capacitor 208 may be selected based upon the predetermined power required to generate and transmit the dying gasp reports. The ONU with hardware centric power detection 200 may determine the power loss reason by indicators received at the controller 205. If the controller receives a first indicator from the switch detector 204 and a subsequent indicator from the external power detector 203, the ONU with hardware centric power detection 200 may determine that the power switch has been formally shut off. If the controller only receives an indicator from the external power detector 203, the ONU with hardware centric power detection 200 may determine that power has been abnormally lost.

Figure 2B:
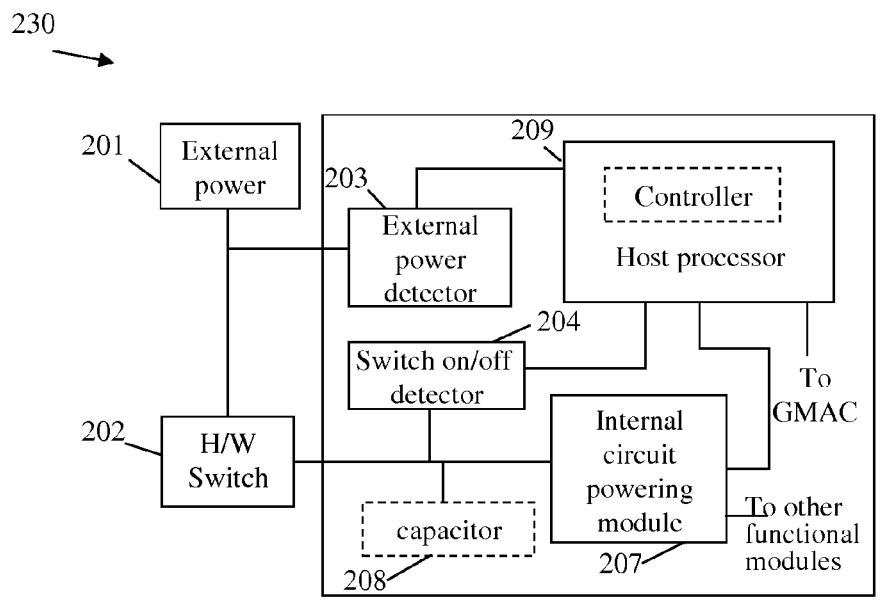
FIG. 2B is a schematic diagram of a second embodiment of an ONU with hardware centric power detection.

FIG. 2B is a schematic diagram of a second embodiment of an ONU with hardware centric power detection 230. The ONU with hardware centric power detection 230 may be configured and function substantially similar to the ONU with hardware centric power detection 200. However, the ONU with hardware centric power detection 230 comprises a controller/host processor module 209. The controller/host processor module 209 may combine the functionality of the controller 205 and the host processor 206 into a single module. Combining modules into a single module may reduce cost and size of the ONU with hardware centric power detection 230. The functionality of other modules may also be combined into other single modules, e.g. to reduce cost, power consumption, size, and other improvements to the various embodiments disclosed herein.

Figure 2C:
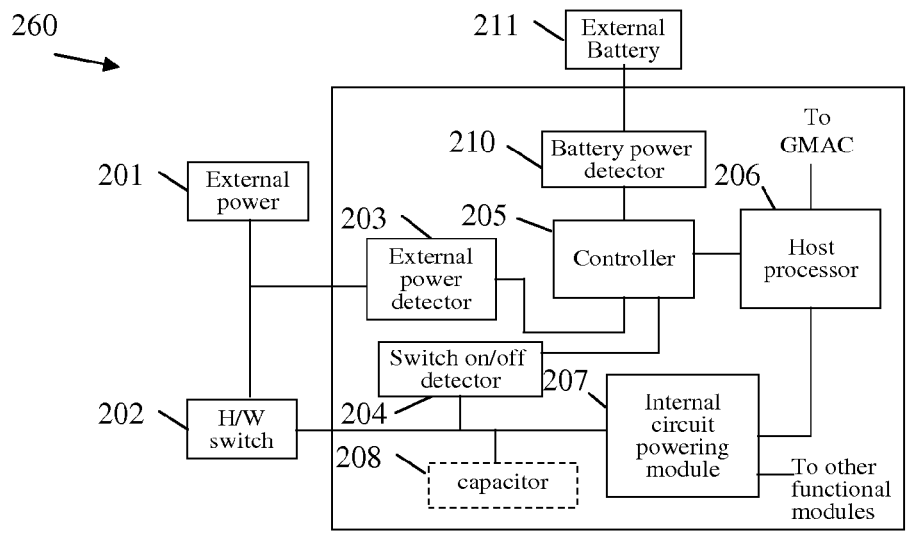
FIG. 2C is a schematic diagram of a third embodiment of an ONU with hardware centric power detection.

FIG. 2C is a schematic diagram of a third embodiment of an ONU with hardware centric power detection 260. The ONU with hardware centric power detection 260 may be substantially similar to the ONU with hardware centric power detection 200, however the ONU with hardware centric power detection 260 further comprises an external battery 211, and battery power detector 210. The external battery 211 may allow the ONU with hardware centric power detection 260 to continue to function if external power 201 is lost. The functionality of ONU with hardware centric power detection 260 remains substantially similar to that of the ONU with hardware centric power detection 200. The battery power detector 210 monitors the power output from the external battery 211. If the power level received from the external battery 211 drops below a predefined level, e.g. the level necessary for operation of the ONU with hardware centric power detection 260, the battery power detector 210 may alert the controller 205. Upon receiving the alert from the battery power detector 210, the controller 205 may notify the host processor 206 of the alert. The notification may be in the form of an interrupt sent to the host processor 206. The host processor 206 may then transmit a message comprising the power loss reason to an OLT connected to the ONU with hardware centric power detection 260, e.g. power loss due to external battery 211 failure.

Figure 3A:
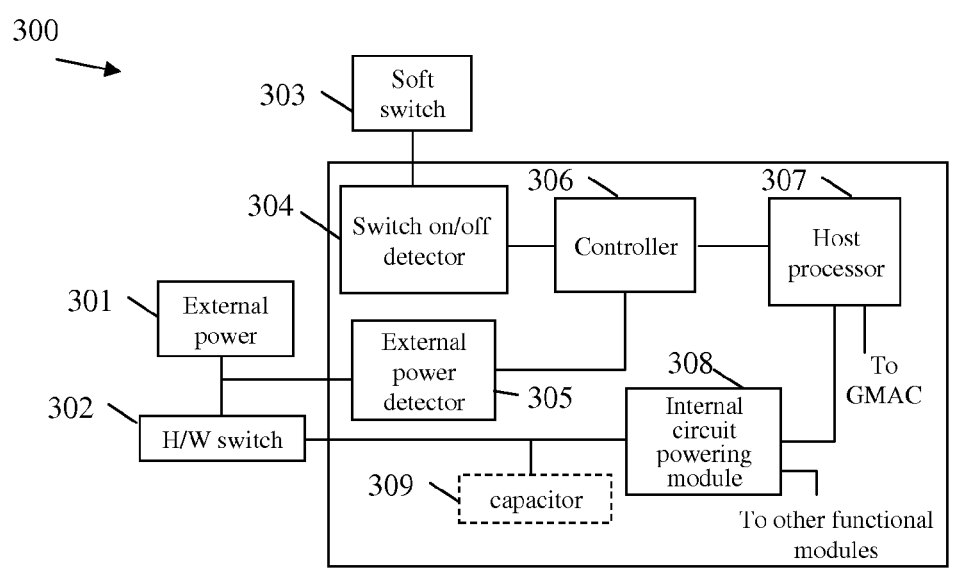
FIG. 3A is a schematic diagram of a first embodiment of an ONU with software centric power detection.

FIG. 3A is a schematic diagram of a first embodiment of an ONU with software centric power detection 300. The ONU with software centric power detection 300 may comprise an external power detector 305 coupled to an external power source 301, and a controller 306. The ONU with software centric power detection 300 may further comprise a software switch 303 coupled to a switch detector 304. The controller 306 may be coupled to the switch detector 304 and a host processor 307. The host processor 307 may be coupled to an internal circuit power module 308 and a GMAC (not shown). The internal circuit power module 308 may be coupled to an optional capacitor 309, a hardware switch 302, and other functional modules not shown in the schematic diagram.

The switch detector 304 may be configured to monitor and detect the state of the software switch 303, e.g. on or off. If the software switch 303 is changed to the off state, the switch detector 304 may detect the state of the software switch 303 and send an indicator to the controller 306 to notify the controller 306 of the state of the software switch 303. The state of the software switch 303 may have changed to off, however power may still be applied to the ONU with software centric power detection 300. The controller 306 may store the occurrence of the software switch 303 state changing to off. The controller 306 may also store the time of the state change and other relevant data related to the software switch 303 state being changed to the off position. Upon receiving the indicator from the switch detector 304, the controller 306 may notify the host processor 307 of the state of the software switch 303. The notification may be in the form of an interrupt sent to the host processor 307. Upon receiving the interrupt, the host processor 307 may use system software to generate and transmit an ONU manual power off message comprising a reason for power loss indicator, e.g. ONU switched off. The generation and transmission of the ONU manual power off message may be performed by hardware and/or software available on the ONU with software centric power detection 300. The ONU manual power off message may be transmitted to an OLT at a central office for tracking purposes. Upon transmitting the ONU manual power off message, the system software may send an indicator to the controller 306 indicating that it is safe to power down. The controller 306 may then power down the ONU with software centric power detection

300. In some embodiments, the system software may store any critical data in non-volatile memory prior to sending the power down indicator to the controller 306.

The external power detector 305 may be configured to monitor and measure the power level received from the external power source 301. If the power level received from the external power source 301 drops below a predefined level, e.g. the level necessary for operation of the ONU with software centric power detection 300, the external power detector 305 may alert the controller 306. Upon receiving the alert from the external power detector 305, the controller 306 may notify the host processor 307 of the alert. The notification may be in the form of an interrupt sent to the host processor 307. The host processor 307 may then transmit a power loss message comprising the power loss reason to an OLT connected to the ONU with software centric power detection 300, e.g. power loss due to external power source 301 failure.

In the case of power loss at the external power source 301, the amount of time available for the ONU with software centric power detection 300 to generate and transmit the power loss message is dependant upon the capacity of the capacitor 309. A capacitor 309 may be selected based upon the predetermined power required to generate and transmit the power loss message. The ONU with software centric power detection 300 may determine the power loss reason by indicators received at the controller 306. If the controller receives an indicator from the switch detector 304, the ONU with software centric power detection 300 may determine that the software power switch 303 has been formally shut off. If the controller receives an indicator from the external power detector 305, the ONU with software centric power detection 300 may determine that power has been abnormally lost.

Figure 3B:
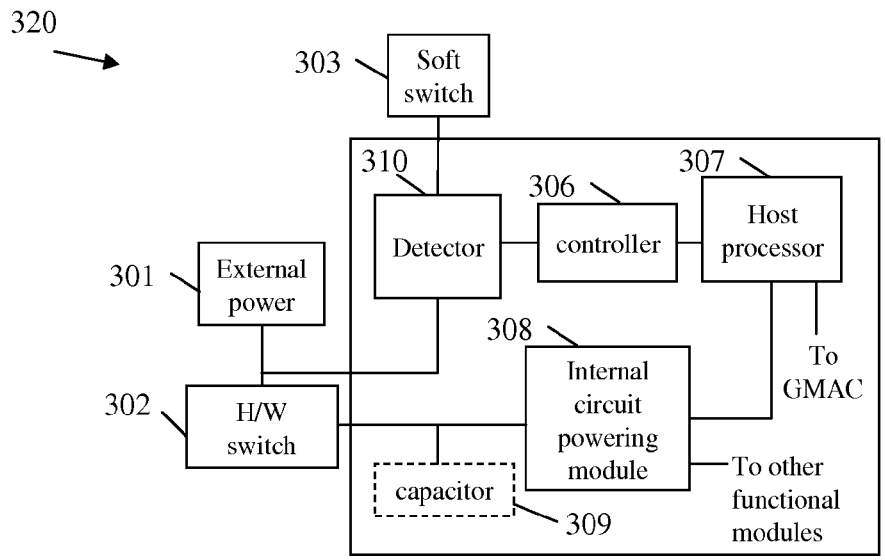
FIG. 3B is a schematic diagram of a second embodiment of an ONU with software centric power detection.

FIG. 3B is a schematic diagram of a second embodiment of an ONU with software centric power detection 320. The ONU with software centric power detection 320 may be configured and function substantially similar to the ONU with software centric power detection 300. The functionalities of the switch detector 304 and the external power detector 305 have been combined into a single module: detector 310. Detector 310 may be coupled to a software switch 303, an external power source 301, and a controller 306. The detector 310 may serve as a substitute for the switch detector 304 and the external power detector 305 in any of the embodiments disclosed herein. Combining modules into a single module may reduce cost and size of the ONU with software centric power detection 320. The functionality of other modules may also be combined into other single modules, e.g. to reduce cost, power consumption, size, and other improvements to the various embodiments disclosed herein.

Figure 3C:
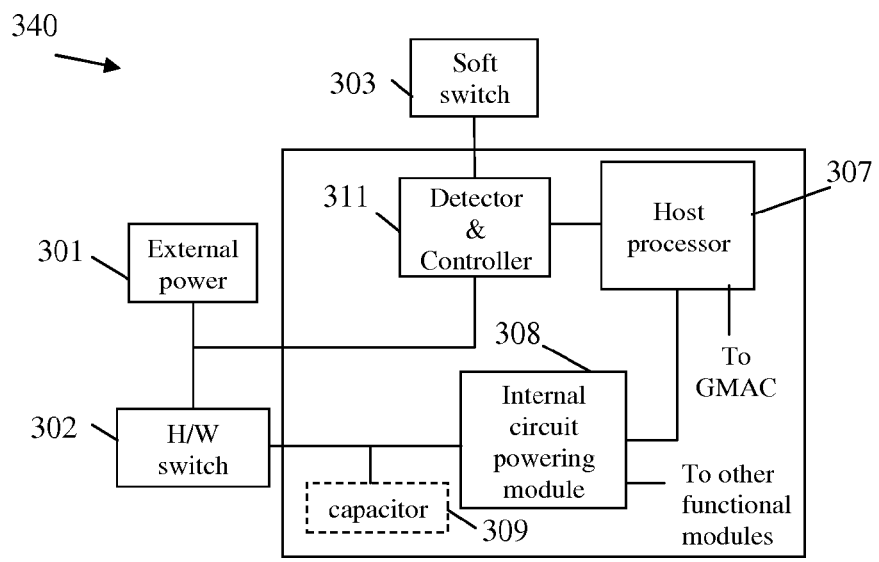
FIG. 3C is a schematic diagram of a third embodiment of an ONU with software centric power detection.

FIG. 3C is a schematic diagram of a third embodiment of an ONU with software centric power detection 340. The ONU with software centric power detection 340 may be configured and function substantially similar to the ONU with software centric power detection 300. In this embodiment, the functionality of the switch detector 304, the external power detector 305, and the controller 306 may be combined into a single module, detector/controller 311. The detector/controller 311 may be coupled to the host processor 307, the soft switch 303, and the external power source 301. As described above, combining modules into a single module may reduce cost and size of the ONU with software centric power detection 340.

Figure 3D:
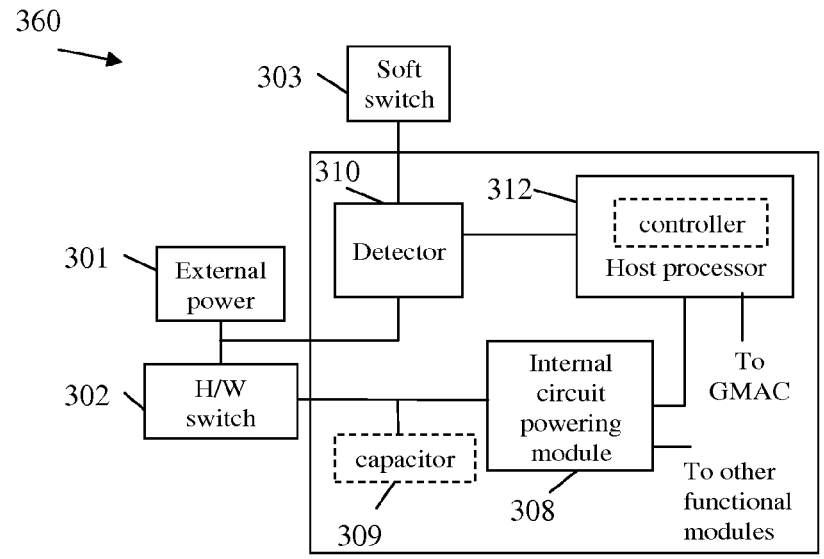
FIG. 3D is a schematic diagram of a fourth embodiment of an ONU with software centric power detection.

FIG. 3D is a schematic diagram of a fourth embodiment of an ONU with software centric power detection 360. The ONU with software centric power detection 360 may be configured and function substantially similar to the ONU with software centric power detection 300. The functionalities of the switch detector 304 and external power detector 305 have been combined into a single module, detector 310. The functionalities of the host processor 307 and controller 306 have been combined into a single module, controller/host processor 312. Detector 310 may be coupled to the software switch 303, the external power source 301, and the controller/host processor 312. The controller/host processor 312 may be coupled to the internal circuit powering module 308 and the GMAC. As described above, combining modules into a single module may reduce cost and size of the ONU with software centric power detection 360.

Figure 3E:
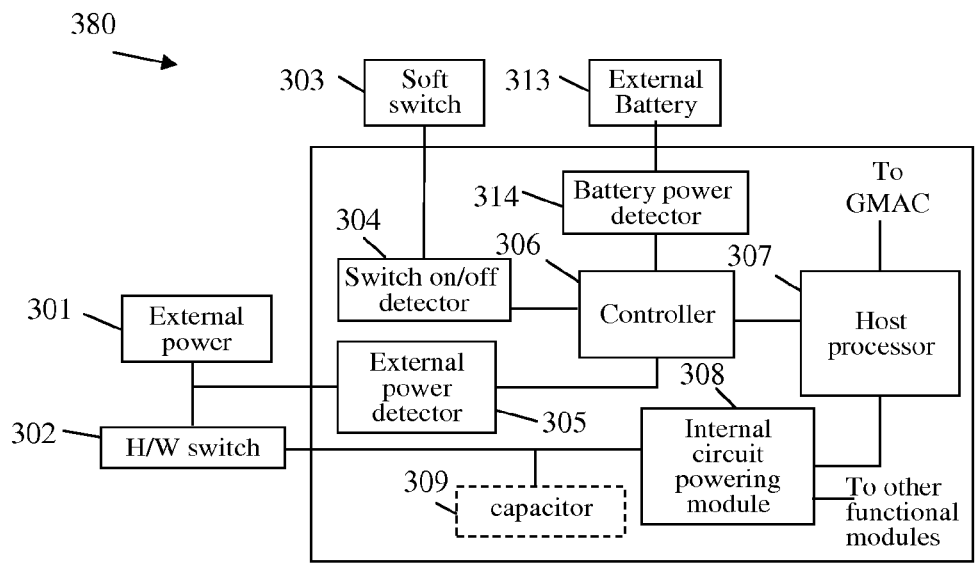
FIG. 3E is a schematic diagram of a fifth embodiment of an ONU with software centric power detection.

FIG. 3E is a schematic diagram of a fifth embodiment of an ONU with software centric power detection 380. The ONU with software centric power detection 380 may be configured substantially similar to the ONU with hardware centric power detection 300. The ONU with software centric power detection 380 further comprises an external battery 313, and battery power detector 314. The external battery 313 may allow the ONU with software centric power detection 380 to continue to function if external power 301 is lost. The functionality of the ONU with software centric power detection 380 remains substantially similar to that of the ONU with software centric power detection 300. The battery power detector 314 monitors the power output from the external battery 313. If the power level received from the external battery 313 drops below a predefined level, e.g. the level necessary for operation of the ONU with software centric power detection 380, the battery power detector 314 may alert the controller 306. Upon receiving the alert from the battery power detector 314, the controller 306 may notify the host processor 307 of the alert. The notification may be in the form of an interrupt sent to the host processor 307. The host processor 307 may then transmit a message comprising the power loss reason to an OLT connected to the ONU with software centric power detection 380, e.g. power loss due to external battery 313 failure. The external battery 313 and external battery power detector 314 may be added to any of the embodiments disclosed herein to provide backup power in the case of external power 301 loss.

FIG. 4 is a block diagram of an embodiment of a PLOAM message 400, which may be used in conjunction with existing PLOAM alarm messages. PLOAM message 400 may be configured as a dying gasp message. The PLOAM message 400 may comprise 12 octets. The first octet 410 may comprise an ONU-identifier (ID). The ONU-ID may indicate the ONU that is sending the dying gasp message to an OLT. The second octet 420 may comprise a message identification corresponding to a dying gasp message, e.g. '00000011'. The third octet 430 may comprise a reason indicator. The reason indicator may indicate to the OLT receiving the message the reason for the dying gasp message. A value of '00000001' in the third octet 430 may indicate that the power switch at the ONU was formally turned off. A value of '00000010' in the third octet 430 may indicate that the external power at the ONU is abnormally off. A value of '00000100' in the third octet 430 may indicate that there is an internal circuit fault at the ONU. The fourth through twelfth octets 440 may be reserved for future use. While several reason indicators are described herein, other reason indicators may be used by the ONU to transmit a reason for power loss at the ONU over the PLOAM channel.

FIG. 5 is a block diagram of an embodiment of OMCI alarm extensions 500, which may be used in conjunction with existing OMCI alarm messages. The OMCI alarm extensions 500 may comprise new OMCI alarms indicating the cause of power loss at an ONT. OMCI alarm 7 510 may be a dying gasp alarm that indicates the ONT is powering off immediately due to loss of power to the ONT itself, rather than being turned off manually. This alarm may be sent in conjunction with the powering alarm if a backup unit cannot supply power and the ONT is shutting down. OMCI alarm 12 520 may be an ONT manual power off alarm used to indicate that ONT is shutting down because a subscriber (e.g. a user) has turned off the ONT's power switch. OMCI alarm 13 530 may be a dying gasp caused by external power loss message used to indicate that the ONT is powering off because of an external power loss. OMCI alarm 14 540 may be a dying gasp caused by a circuit fault message used to indicate that the ONT is powering off because of an internal circuit fault. While several OMCI alarms are described herein, other OMCI alarms may be used by the ONT to transmit a reason for power loss at the ONT over the OMCI channel.

FIG. 6 is a block diagram of an embedded OAM message 600, which may be used in conjunction with existing embedded OAM alarm messages. The embedded OAM message 600 may comprise 8 bits. The embedded OAM message 600 may correspond to the indication (Ind) field contained in the structured overhead of upstream GTC frames. Bit seven 610 may be used to indicate if a PLOAM is waiting for the OLT. If bit seven 610 is set to one, then a PLOAM message may be waiting. If bit seven 610 is set to zero, then a PLOAM message may not be waiting. Bit six 620 may be used to indicate the status of forward error correction (FEC). If bit six 620 is set to one then FEC is on. If bit six 620 is set to zero, then FEC is off. Bit five 630 may contain the remote defect indication (RDI) status. If bit five 630 is set to one, then a remote defect is present. If bit five 630 is set to zero, then a remote defect is not present. Bit four 640 may be reserved, and may be ignored by the OLT. Bits three through one 650 may be used as a reason indicator. If bits three though one 650 contain the sequence '001', then the power switch at the ONU may have bee formally shut off. If bits three though one 650 contain the sequence '010', then the external power source at the ONU may be abnormally off. If bits three though one 650 contain the sequence '100', then there may be an internal circuit fault at the ONU. Bit zero 660 may be reserved for future use. While several bit sequences for bits three through one 650 are described herein, other bit sequences for bits three through one 650 may be used by the ONU to transmit a reason for power loss at the ONU over the embedded OAM channel.

Figure 7:
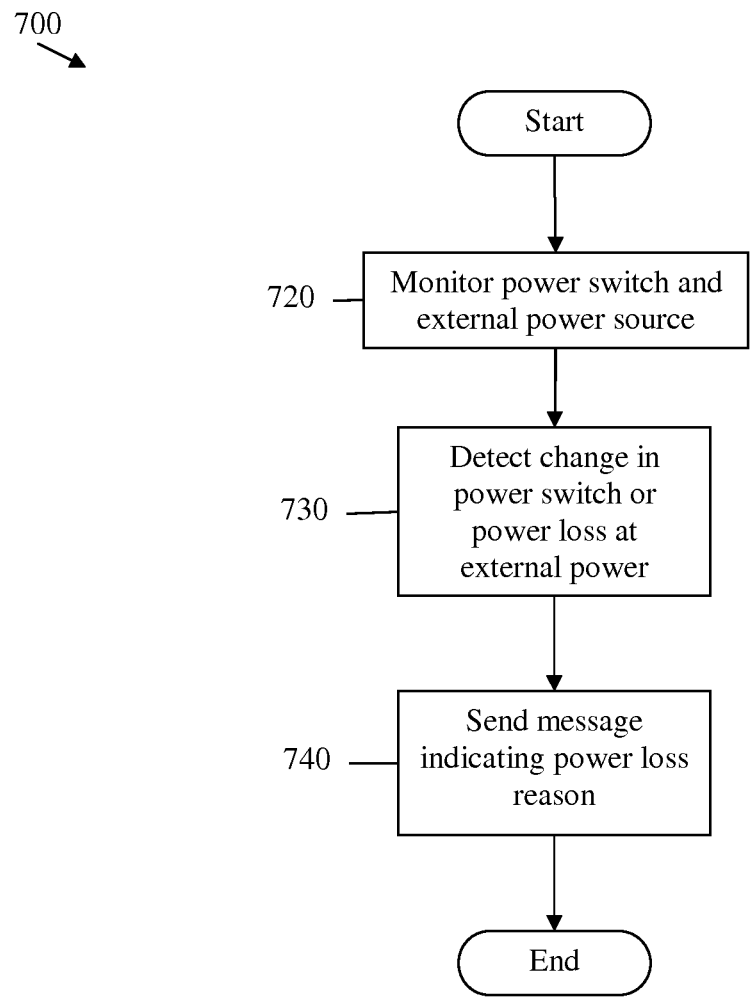
FIG. 7 is a flow chart of an embodiment of a method for indicating a power loss reason.

FIG. 7 is a flow chart of an embodiment of a method for indicating a power loss reason 700. The method 700 starts at block 720, an ONU may monitor its power switch and/or external power source. The monitoring may be accomplished by a single module or a plurality of modules within the ONU. The external power source may be monitored for output power level. The power switch may be monitored for the current position, e.g. on or off. The method continues at block 730 when the ONU may detect a change of the power switch, or power loss at the external power supply. At block 740, the ONU may send a message indicating the power loss reason to an OLT or some other upstream monitoring device. The message may be one or more of a PLOAM message, an embedded OAM message, or an OMCI message. The ONU may send the message via one, two, or three of a PLOAM channel, an embedded OAM channel, or an OMCI channel.

Figure 8:
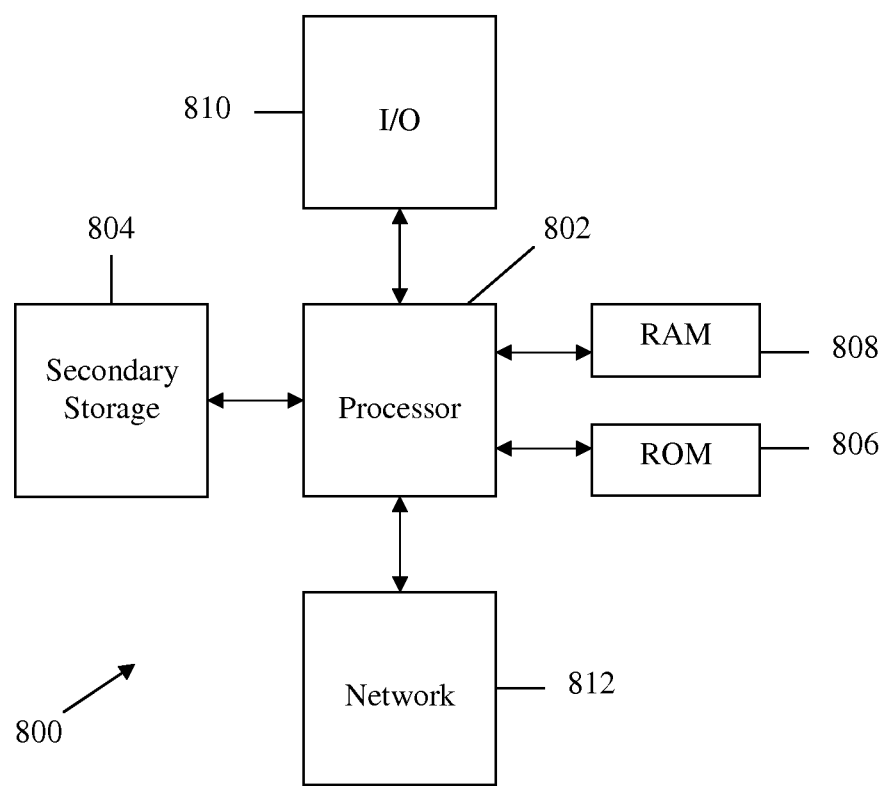
FIG. 8 is a schematic diagram of an embodiment of a general purpose computer.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A passive optical network (PON) component comprising:
    a first detector configured to monitor a power switch;
    a second detector configured to monitor a power source;
    a processor configured to receive an interrupt from the first detector and transmit a message comprising a first indicator that the PON component has powered down and a second indicator giving a reason for the power down, wherein the PON component is an optical network terminal (ONT); and
    a controller positioned between the first detector and the processor, wherein the controller is configured to:
        store an occurrence of the PON component powering down; and
        store a time of the occurrence.

2. The PON component of claim 1, wherein the first detector and the second detector are the same detector.

3. The PON component of claim 1, wherein the second detector is configured to send an interrupt responsive to the power source dropping below a predefined level.

4. The PON component of claim 3, wherein the predefined level is based upon a minimum power required for the PON component to function.

5. The PON component of claim 1, wherein the power source is at least one of a battery and an external power supply.

6. The PON component of claim 1, wherein the power switch is a software switch.

7. The PON component of claim 1, further comprising a third detector coupled to a backup battery and configured to monitor the backup battery and send an interrupt if power of the backup battery drops below a predefined level.

8. The PON component of claim 1, wherein the interrupt indicates that external power to the PON component has been discontinued because the power switch has turned off, and wherein the interrupt is sent responsive to the power switch being switched off.

9. The PON component of claim 1, further comprising a capacitor configured to store a charge sufficient to transmit the message.

10. A passive optical network (PON) component comprising a processor configured to:
    receive an interrupt message from a detector; and
    determine whether a reason for the interrupt is a power switch is switched to off, external power is abnormally off, or an internal circuit has a fault;
    a transmitter coupled to the processor and configured to transmit a dying gasp message comprising an indicator of the reason for the interrupt; and
    a controller positioned between the detector and the processor, wherein the controller is configured to: store an occurrence of the interrupt; and store a time of the interrupt.

11. The PON component of claim 10, wherein the dying gasp message is a physical layer operation, administration and management (PLOAM) message and is transmitted on a PLOAM channel.

12. The PON component of claim 11, wherein the indicator is located in a third octet of the PLOAM message.

13. The PON component of claim 11, wherein the processor is further configured to transmit a second dying gasp message comprising the indicator, and wherein the second dying gasp message is an embedded operation, administration and management (OAM) message and is transmitted on an embedded OAM channel.

14. The PON component of claim 13, wherein the indicator is located in bits one, two, and three of an indication (Ind) field contained in an overhead of an upstream gigabit passive optical network transmission convergence (GTC) frame.

15. The PON component of claim 13, wherein the processor is further configured to transmit a third dying gasp message comprising the indicator, and wherein the third dying gasp message is an optical network terminal management and control interface (OMCI) message and is transmitted on an OMCI channel.

16. The PON component of claim 15, wherein the indicator is an alarm flag in the OMCI message.

17. The PON component of claim 10, wherein the interrupt indicates that the reason for the interrupt is one of: a power switch is switched to off, external power is abnormally off, or an internal circuit has a fault.

* * * * *